United States Patent [19]

Michel

[11] Patent Number: 4,766,310

[45] Date of Patent: Aug. 23, 1988

[54] PHOTOELECTRIC POSITION MEASURING INSTRUMENT WITH GRIDS

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 932,788

[22] Filed: Nov. 19, 1986

[30] Foreign Application Priority Data

Nov. 21, 1985 [DE] Fed. Rep. of Germany ....... 3541199

[51] Int. Cl.⁴ .............................................. H01J 3/14
[52] U.S. Cl. .................................. 250/237 G; 356/395
[58] Field of Search ................. 340/347 P; 33/125 A, 33/125 C; 356/395, 373, 374, 375; 250/237 G, 231 SE, 237 R

[56] References Cited

U.S. PATENT DOCUMENTS

| | | | |
|---|---|---|---|
| 3,812,352 | 5/1974 | MacGovern | 356/395 |
| 4,051,367 | 9/1977 | Sayce | 250/237 G |
| 4,176,276 | 11/1979 | Kaul et al. | 356/395 |
| 4,461,083 | 7/1984 | Ernst | 33/125 C |
| 4,677,293 | 6/1987 | Michel | 356/375 |

FOREIGN PATENT DOCUMENTS 0163362 2/1985 European Pat. Off.
1191336 7/1967 United Kingdom.

Primary Examiner—David C. Nelms
Assistant Examiner—Jessie Ruoff
Attorney, Agent, or Firm—Willian Brinks Olds Hofer Gilson & Lione Ltd.

[57] ABSTRACT

A position measuring instrument, comprising a scanning grid, a scale grid and an illumination unit, is used to produce two sets of diffracted partial light rays. The scanning grid defines a grid constant and is formed by two scanning fields, constructed as phase grids, offset to one another in the measuring direction by ¼ of the grid constant. The phase grids have a slat-to-furrow width ratio that deviates from a 1:1 ratio. The scale grid has the same grid constant as the scanning grid but has a slat-to-furrow ratio of 1:1. The grids cooperate with the illumination unit to produce diffracted partial light rays of several orders. An oppositely deflecting prism is allocated to each scanning field. A first and second set of diffracted partial light rays are generated, wherein the second set is opposite in phase to the first set. A photodetector is allocated to each respective selected order of the two sets of light rays to produce corresponding electrical signals.

10 Claims, 4 Drawing Sheets

PHOTOELECTRIC POSITION MEASURING INSTRUMENT WITH GRIDS

BACKGROUND OF THE INVENTION

The present invention relates to a photoelectric position measuring instrument comprising an illumination unit, a scale grid, a scanning grid defining at least two scanning fields and optical means allocated to the scanning fields wherein the scale grid and the scanning grid operate as phase grids to produce, in cooperation with the illumination unit and the optical means, a first and second set of diffracted partial light rays of substantially opposite relative phase.

Position measuring instruments using phase grids are known. Examples of such measuring instruments are disclosed in German published application DE-AS No. 15 48 707 and German unexamined patent specification DE-OS No. 23 16 248.

Additionally, in the non-prior-published European patent application No. 85301077.5, corresponding to EP No. 0 163 362 A1, a position measuring instrument is disclosed wherein light rays, which are diffracted on an index grid, are generated with relative phase displacement. The index grid comprises a plurality of slats and furrows and is constructed as a phase grid. The phase displacement is produced by means that, for a given grid constant, the width of a slat of the index grid differs from the width of a furrow.

Phase grids of this type produce light rays of different diffraction orders. The orders may be displaced with respect to one another and used to determine the direction of the relative displacement between the scale grid and the index grid.

In a direct light, phase grid measuring system, the degree of modulation of the zero and ± first order diffraction signals are different from one another and may vary. The index and scale grids of such a system are arranged parallel to one another and comprise slats and furrows of unequal width. The degree of modulation may vary with changes in the distance between the index and scale grids, dirtying of the grids, and the like.

The variation in the degree of modulation occurs in accordance with the three grid scanning principle and is attributable to the unavoidable geometric optical imaging of the light source onto the photodetector used for detecting the zero diffraction order light rays. The three grid scanning principle is illustrated in U.S. Pat. No. 4,051,367.

A disadvantage of the above described system is that the variation in the degree of modulation results in an inaccurate and uncertain electronic evaluation of the signals.

It is an object of the present invention to reduce, in position measuring instruments of this type, the measuring sensitivity with respect to distance changes, deviations from parallelism of the grids, fouling, and the like.

SUMMARY OF THE INVENTION

The present invention is directed to a photoelectric position measuring instrument comprising means for generating a first set of diffracted partial light rays and a second set of diffracted partial light rays opposite in phase to the first set.

According to a preferred embodiment of the present invention, a measuring instrument is constructed in accordance with the three grid principle. The instrument comprises a scanning grid and a scale grid, wherein each grid defines a common grid constant. Each of the grids comprises a plurality of slats and furrows and is constructed as a phase grid. The slat-to-furrow ratio of the scale grid is 1:1 and the slat-to-furrow ratio of the scanning grid is other than 1:1. The scanning grid comprises two scanning fields offset from one another by ¼ of the grid constant. An oppositely deflecting prism is allocated to each scanning field. Light emanating from an illumination source is diffracted by the scanning grid, diffracted by the scale grid, reunited on the scanning grid and then brought to an interference. The prisms deflect the resulting partially diffracted light rays into two spaced and oppositely phased sets. The light rays are then collimated by a condensor and detected by respective sets of photodetectors.

One advantage of the position measuring instrument of the present invention is that phase displaced scanning signals for direction recognition may be generated in a simple manner. Additional advantages arise in that push-pull signals and their electrical summation, for compensation of scanning interference influences, may also be simply generated.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

The term "light" is used throughout this document in describing the present invention. It should be understood that the word "light" refers not only to radiation lying in the visible range, but also to ultraviolet and infrared radiation. It should also be understood that the representations contained in FIGS. 1–4c have been greatly simplified for purposes of illustration.

Figure 1:
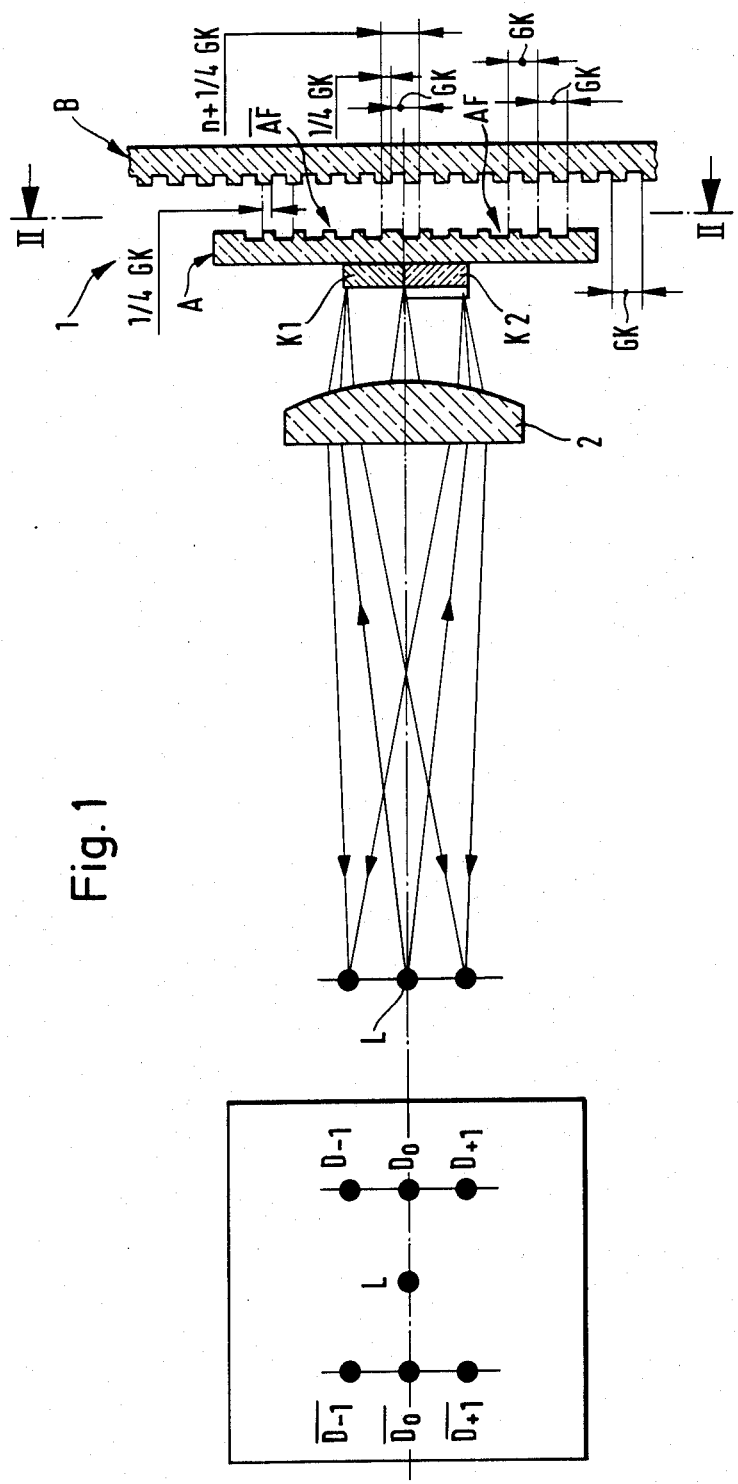
FIG. 1 is a schematic representation of a first preferred embodiment of the present invention constructed as a direct light measuring instrument.

Turning now to the drawings, in FIG. 1 there is represented a length measuring instrument 1 which operates in accordance with the three grid, direct light principle. The radiation produced by a light source L is collimated by a condensor 2 and diffracted and reflected by phase grids A, B. The resulting partially diffracted light rays are then directed onto two sets of photodetectors $D_0, D_{-1}, D_{+1}$, and $\bar{D}_0, \bar{D}_{-1}, \bar{D}_{+1}$.

Figure 2:
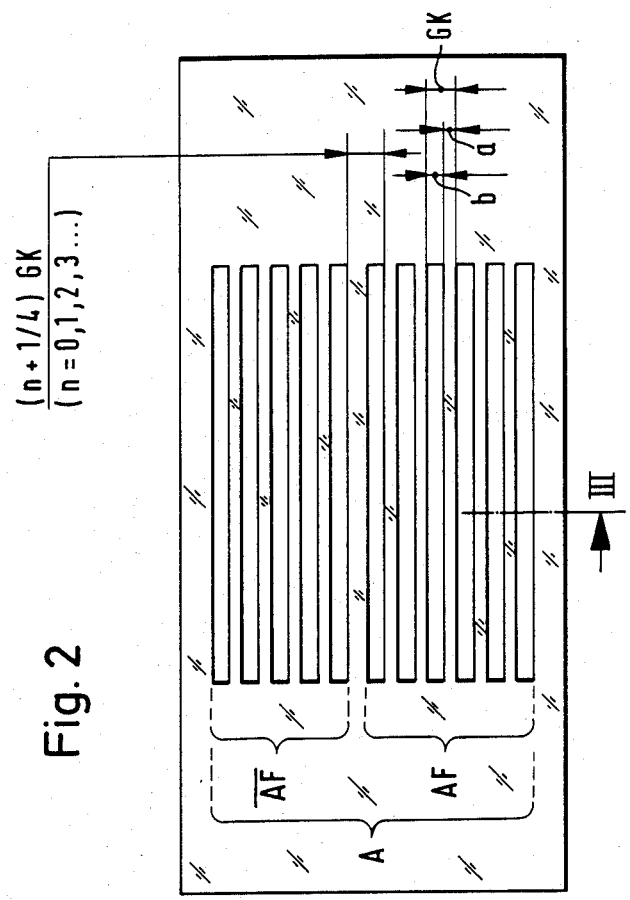
FIG. 2 is an enlarged plan view of the scanning grid of the embodiment of FIG. 1 taken along lines II—II.
Figure 3:
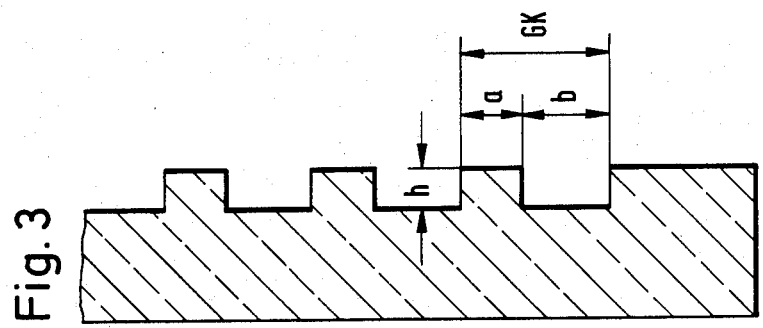
FIG. 3 is an enlarged cross-sectional representation of a portion of the phase grid of FIG. 2 showing a portion of the slats and furrows.

The phase grid B represents the scale grid and has a slat-to-furrow width ratio of 1:1. The phase grid A represents the scanning grid and defines two scanning fields AF and $\overline{AF}$. In contrast to the scale grid B, the slat-to-furrow width ratio a:b of the scanning fields AF and $\overline{AF}$ differs from a 1:1 ratio, as shown in FIGS. 2 and 3.

The phase grid of scale grid B and the phase grid of scanning grid A have the same grid constant GK. The scale grid B is arranged parallel to the scale grid A and is displaceable perpendicularly to the course of the graduation markings in the plane parallel to the scale grid A.

The radiation emanating from the light source L is diffracted by the scanning grid A in the direction of the light emitted by the light source. The diffracted light is again diffracted by the scale grid B and reunited on the scanning grid A to bring about an interference.

Although the scale grid B and the scanning grid A define equal grid constants GK, the slat-to-furrow width ratios of the grids are unequal. The slat-to-furrow width ratio of the scale grid B is 1:1 and that of the scanning grid A is, for example, 1:1.5. This slat-to-furrow width ratio difference between the two grids A, B results in the refracted light rays of different diffraction orders being displaced with respect to one another in their phase position.

The condensor 2 is positioned between the light source L and the grids A, B and defines a focal plane. The two sets of photodetectors $D_0$, $D_{-1}$, $D_{+1}$ and $\overline{D}_0$, $\overline{D}_{-1}$, $\overline{D}_{+1}$ are located in the focal plane and positioned in correspondence with the diffraction theory of grids. The photodetectors, for purposes of illustration, are represented in FIG. 1 as folded into the drawing plane to the left of the measuring instrument 1.

The direction of relative movement between the scanning grid A and the scale grid B can be determined from the phase displaced diffracted partial light rays that fall upon the photodetectors $D_0$, $D_{-1}$, $D_{+1}$. This determination is made possible by the slat-to-furrow width ratio of the scanning grid A differing from the 1:1 ratio of the scanning grid B.

The scanning grid A is provided, as shown in FIGS. 1 and 4, with selectively acting optical means K1, K2. The optical means K1, K2, in cooperation with the two scanning grids AF, $\overline{AF}$, generate a set of diffracted partial light rays which are opposite in phase to the above described diffracted partial light rays.

The scanning fields AF and $\overline{AF}$ are, for this purpose, offset to one another in the measuring direction by a fraction, for example, ¼, of the grid constant GK. Prisms K1, K2 are allocated to the scanning fields AF, $\overline{AF}$, respectively, and deflect the two sets of diffracted partial light rays in opposite directions.

Figure 4A:
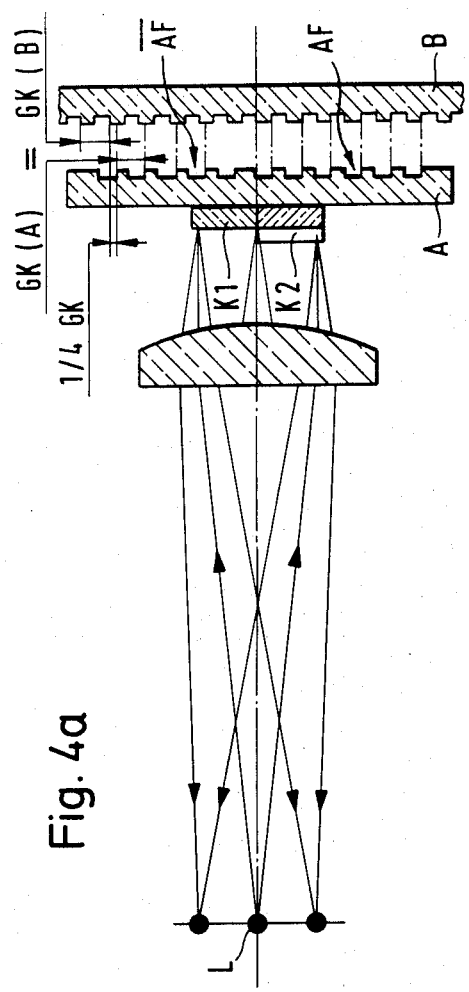
FIG. 4a is a schematic representation of the direct light measuring instrument of FIG. 1.
Figure 4B:
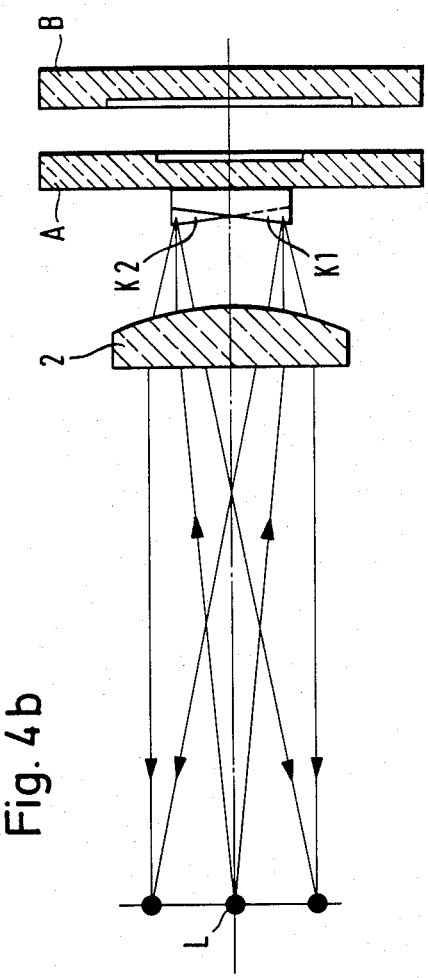
FIG. 4b is a schematic representation of the measuring instrument of FIG. 4a rotated through 90° to better show the orientation of the prisms.

FIGS. 4a, 4b clearly show the configuration of the prisms K1, K2. FIG. 4a is a representation of the position measuring instrument 1 shown in FIG. 1, and FIG. 4b is a representation of the position measuring instrument 1 rotated through 90°.

FIGS. 4a, 4b show that the two prisms K1, K2, which are allocated to the scanning fields AF, $\overline{AF}$, deflect the counterphased diffracted partial light rays and the diffracted partial light rays onto the respective photodetectors $\overline{D}_0$, $\overline{D}_{-1}$, $\overline{D}_{+1}$, and $D_0$, $D_{-1}$, $D_{+1}$. The arrangement of the photodetectors $\overline{D}_0$, $\overline{D}_{-1}$, $\overline{D}_{+1}$ and $D_0 D_{-1}$, $D_{+1}$ is shown in each case in the lefthand portion of FIGS. 4a, 4b. In each of these figures, the focal plane of the condensor 2 is shown folded into the drawing plane. However, it should be understood that, in actuality, the focal plane lies perpendicular to the drawing plane.

Figure 4C:
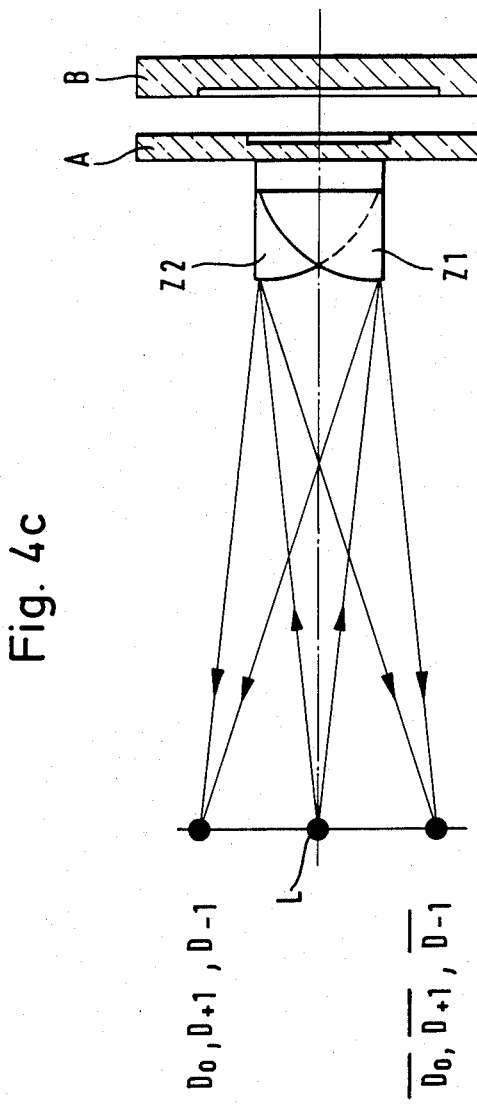
FIG. 4c is a second preferred embodiment of the measuring instrument of FIG. 4b with decentered lenses substituted for the prisms.

A second preferred embodiment of the present invention is schematically shown in FIG. 4c. Two lenses Z1, Z2, decentered and oriented in opposite directions, are allocated to the scanning fields AF and $\overline{AF}$. The lenses Z1, Z2 collimate the light and deflect it onto the corresponding photodetectors $\overline{D}_0$, $\overline{D}_{-1}$, $\overline{D}_{+1}$ and $D_0$, $D_{-1}$, $D_{+1}$. Since the arrangement shown in FIG. 4c uses decentered lenses Z1, Z2 rather than the prisms K1, K2, the condensor 2 used in the first preferred embodiment can be eliminated. The positioning of the photodetectors, for the arrangement shown in FIG. 4c, corresponds in principle to the representation in FIG. 4b. A separate drawing of the photodetector arrangement is unnecessary for an understanding of the present invention and is therefore not provided in FIG. 4c.

In choosing the selectively acting optical means, the worker in the field is not restricted by the examples presented. The worker in the field has the option of not adjusting the decentered lenses in opposite directions, but instead may select corresponding optical components which deflect in the same direction and present different angles of deflection. Echelette grids with different grid constants and direction of deflection are particularly well-suited to perform this optical function.

Similarly, the selectively acting optical means can be formed by components with different spectral and polarizational optical properties. Of course, the photodetectors must be attuned to these optical means.

Further, it lies in the discretion of the worker in the field to use in the illumination means and in the photodetector system the techniques of fiber optics.

The above embodiments may be used in measuring systems wherein electrical signals with a defined relative phase relationship are produced from the photodetectors. If desired, the phase displacement between the output of the photodetectors $D_{+1}$ and $D_{-1}$ can be adjusted exactly, for example, to 90°. This adjustment may be accomplished by one skilled in the art through the geometrical formation of the scanning fields AF and $\overline{AF}$ wherein the geometrical formation relates to the slat-to-furrow width ratio a:b and the furrow depth h.

Additionally, a push-pull signal may be generated from the electrical signals through the anti-parallel switching of the signals from the photodetectors $D_{+1}$ with $\overline{D_{+1}}$ and $D_{-1}$ with $\overline{D_{-1}}$.

Special advantages occur in respect to efficiency if the zero order diffraction signal is also evaluated. The signals from the photodetectors $D_0$ and $\overline{D}_0$ may be switched in an anti-parallel manner to generate the 0° signal. A stable phase displacement from 90° to the 0° signal is obtained if the difference is formed of the anti-parallel switching of the signals from the photodetectors $D_{+1}$ with $\overline{D_{+1}}$ and of the anti-parallel switching of the signals from the photodetectors $D_{-1}$ with $\overline{D_{-1}}$. With such an evaluation, errors arising from the scanning grid A may be reduced.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. A photoelectric position measuring instrument of the type comprising a measuring graduation, the measuring graduation defining a measuring direction and formed by grids, the measuring graduation further defining a grid constant; and a scanning graduation formed by grids and defining a grid constant substantially equal to that of the measuring graduation; wherein the scanning graduation and the measuring graduation are arranged parallel to and shiftable with respect to one another; the improvement comprising:

- at least one of the scanning and measuring graduations is constructed as a phase grid with the slat width unequal to the furrow width;
- at least a first and second scanning field, the scanning fields displaced with respect to one another in the measuring direction by a fraction of the grid constant; the scanning fields cooperating with the measuring graduation to produce respective sets of diffracted partial light rays such that the firt set is substantially opposite in phase to the second set;
- selectively acting optical means allocated to the scanning fields to detectably separate the two sets of diffracted rays; and
- at least a first and second plurality of photodetectors arranged to detect selected diffraction orders of the respective sets of diffracted rays.

2. The invention of claim 1 wherein the scanning fields are offset with respect to one another in the measuring direction by an amount defined by the relation $(n+\frac{1}{2})*GK$ where $n=0,1,2,3,\ldots$ and GK represents the grid constant.

3. The invention of claim 1 wherein the selectively acting optical means comprises two prisms.

4. The invention of claim 3 wherein each prism is allocated to a respective scanning field and is operative to deflect in directions opposite to one another.

5. The invention of claim 1 wherein the selectively acting optical means comprises decentered lenses operative to collimate and deflect the light rays.

6. The invention of claim 1 wherein the selectively acting optical means comprises echelette grids operative to deflect the light rays in differing directions.

7. The invention of claim 1 wherein the selectively acting optical means comprises a first and second optical means and wherein the first and second optical means have at least one of (1) the spectral optical properties and (2) the polarizational optical properties different from one another.

8. A photoelectric position measuring instrument comprising:

- an illumination means;
- a measuring graduation defining a measuring direction and formed by grids defining a grid constant;
- a first and second scanning field, each scanning field formed by grids defining a grid constant equal to that of the measuring graduation, the scanning fields offset from one another in the measuring direction by a fraction of the grid constant;
- at least one of the measuring graduation and the first and second scanning fields defiing a grid of slats and furrows to form a phase grid;
- a first and second optical means allocated to a respective scanning field; and
- a first and second plurality of photodetectors;
- the illumination means, measuring graduation, scanning fields, optical means and photodetectors cooperating such that light rays emerging from the illumination means are diffracted by the first and second scanning fields and by the measuring graduation to produce a first and second set of diffracted partial light rays of multiple diffraction orders wherein the first and second set of light rays are directed by the first and second optical means, respectively, to impinge upon the first and second plurality of photodetectors, respectively.

9. The invention of claim 8 wherein the scanning fields are offset with respect to one another in the measuring direction by an amount defined by the relation $(n+\frac{1}{2})*GK$ where $n=0, 1, 2, 3, \ldots$ and GK represents the grid constant.

10. The invention of claim 8 wherein the first and second plurality of photodetectors detect the zero and plus and minus first diffraction orders of the first and second set of diffracted partial light rays, respectively.

* * * * *

UNITED STATES PATENT AND TRADEMARK OFFICE
CERTIFICATE OF CORRECTION

PATENT NO. : 4,766,310

DATED : August 23, 1988

INVENTOR(S) : Dieter Michel

It is certified that error appears in the above-identified patent and that said Letters Patent is hereby corrected as shown below:

IN THE CLAIMS

In column 5, line 16, please delete "firt" and substitute therefor --first--.

In column 6, line 16, please delete "defiing" and substitute therefor --defining--.

Signed and Sealed this

Fourth Day of December, 1990

Attest:

HARRY F. MANBECK, JR.

*Attesting Officer*      *Commissioner of Patents and Trademarks*